(12) United States Patent
Cheng (10) Patent No.: US 11,226,694 B2
(45) Date of Patent: Jan. 18, 2022

(54) TOUCH DISPLAY SUBSTRATE, TOUCH DISPLAY METHOD AND TOUCH DISPLAY DEVICE

(71) Applicant: BOE TECHNOLOGY GROUP CO., LTD., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 251 days.

(21) Appl. No.: 16/610,239

(22) PCT Filed: Apr. 8, 2019

(86) PCT No.: PCT/CN2019/081727
§ 371 (c)(1),
(2) Date: Nov. 1, 2019

(87) PCT Pub. No.: WO2019/218800
PCT Pub. Date: Nov. 21, 2019

(65) Prior Publication Data
US 2021/0333910 A1    Oct. 28, 2021

(30) Foreign Application Priority Data
May 16, 2018  (CN) .......................... 201810468133.X (51) Int. Cl.
*G06F 3/045*   (2006.01)
*G06F 3/041*   (2006.01)
(Continued)

(52) U.S. Cl.
CPC ........ *G06F 3/0412* (2013.01); *G02F 1/13338* (2013.01); *G02F 1/134309* (2013.01);
(Continued)

(58) Field of Classification Search
CPC .............. G06F 3/0412; G06F 3/04164; G06F 1/13338; G06F 1/134309; G06F 3/0446; G06F 2203/04111; G06F 2203/04107
See application file for complete search history.

(56) References Cited

U.S. PATENT DOCUMENTS

2016/0216817 A1   7/2016 Yang et al.
2017/0277329 A1*  9/2017 Ding ..................... G06F 3/0447
(Continued)

FOREIGN PATENT DOCUMENTS

CN          103677475 A     3/2014
CN          104238222 A    12/2014
(Continued)

OTHER PUBLICATIONS

Second Office Action dated May 15, 2020 corresponding to Chinese application No. 201810468133.X.
Office Action dated Nov. 25, 2019 issued in corresponding Chinese Application No. 201810468133.X.

*Primary Examiner* — Adam R. Giesy
(74) *Attorney, Agent, or Firm* — Nath, Goldberg & Meyer; Joshua B. Goldberg (57) ABSTRACT

The present application provides a touch display substrate, a touch display method and a touch display device. The touch display substrate comprises a plurality of first touch electrodes, a common electrode configured for at least one row of pixel electrodes forms a respective one of the plurality of first touch electrodes, and the plurality of first touch electrodes are insulated from each other. The touch display substrate further comprises a plurality of second touch electrodes, at least one of a plurality of shielding lines forms a respective one of the plurality of second touch electrodes, and the plurality of second touch electrodes are (Continued)

insulated from each other. The plurality of first touch electrodes and the plurality of second touch electrodes are insulated from each other.

20 Claims, 5 Drawing Sheets

(51) Int. Cl.
*G06F 3/044* (2006.01)
*G02F 1/1343* (2006.01)
*G02F 1/1333* (2006.01)

(52) U.S. Cl.
CPC ........ *G06F 3/0446* (2019.05); *G06F 3/04164* (2019.05); *G06F 2203/04107* (2013.01); *G06F 2203/04111* (2013.01)

(56) References Cited

U.S. PATENT DOCUMENTS

| | | | |
|---|---|---|---|
| 2018/0113541 | A1 | 4/2018 | Xie et al. |
| 2018/0299984 | A1 | 10/2018 | Zang et al. |
| 2019/0354212 | A1* | 11/2019 | Cheng ................... G06F 3/044 |

FOREIGN PATENT DOCUMENTS

| | | |
|---|---|---|
| CN | 104536633 A | 4/2015 |
| CN | 104808885 A | 7/2015 |
| CN | 204883646 U | 12/2015 |
| CN | 106324924 A | 1/2017 |
| CN | 107065365 A | 8/2017 |
| CN | 206931072 U | 1/2018 |
| CN | 108762550 A | 11/2018 |
| WO | 2012/118513 A1 | 9/2012 |

\* cited by examiner

TOUCH DISPLAY SUBSTRATE, TOUCH DISPLAY METHOD AND TOUCH DISPLAY DEVICE

CROSS REFERENCE TO RELATED APPLICATION

This is a National Phase Application filed under 35 U.S.C. 371 as a national stage of PCT/CN2019/081727, filed on Apr. 8, 2019, an application claiming the benefit of Chinese patent application No. 201810468133.X, filed on May 16, 2018, the entire contents of which are incorporated herein by reference.

TECHNICAL FIELD

The present disclosure relates to the field of display and touch technology, and in particular, to a touch display substrate, a touch display method, and a touch display device.

BACKGROUND

In a touch display substrate of a conventional liquid crystal display device, a common electrode layer of a liquid crystal display panel is generally divided into a plurality of common electrode blocks, each common electrode block is electrically connected with a touch control chip through a wire, and the common electrode blocks are reused as touch electrodes. In the display state, the common electrode block is used for receiving a common voltage signal; and in the touch state, the common electrode block is used for receiving a touch driving signal and outputting a touch sensing signal.

SUMMARY

In an aspect, the present disclosure provides a touch display substrate, including: a base substrate; a plurality of data lines on the base substrate and extending in a first direction; a plurality of shielding lines on a side of the plurality of data lines away from the base substrate and extending in the first direction, an orthographic projection of a respective one of the plurality of data lines on the base substrate at least partially overlapping an orthographic projection of a respective one of the plurality of shielding lines on the base substrate; a plurality of pixel electrodes arranged in an array having a plurality of rows and a plurality of columns; and a common electrode on a side of the plurality of pixel electrodes away from the base substrate. The touch display substrate further includes a plurality of first touch electrodes, the common electrode configured for at least one row of pixel electrodes of the plurality of pixel electrodes constitutes a respective one of the plurality of first touch electrodes, and the plurality of first touch electrodes are insulated from each other. The touch display substrate further includes a plurality of second touch electrodes, at least one of the plurality of shielding lines constitutes a respective one of the plurality of second touch electrodes, and the plurality of second touch electrodes are insulated from each other. The plurality of first touch electrodes and the plurality of second touch electrodes are insulated from each other.

In some embodiments, the common electrode configured for directly adjacent rows of pixel electrodes of the plurality of pixel electrodes constitutes the respective one of the plurality of first touch electrodes; and directly adjacent ones of the plurality of shielding lines are electrically connected and constitute the respective one of the plurality of second touch electrodes.

In some embodiments, the touch display substrate further includes a plurality of common electrode lines extending in a second direction different from the first direction and insulated from the plurality of data lines. The plurality of common electrode lines overlap the common electrode, and at least one insulating layer is between the plurality of common electrode lines and the common electrode. The common electrode includes a plurality of common electrode blocks arranged in an array having a plurality of rows and a plurality of columns; a respective one of the plurality of common electrode blocks is configured for a respective one of the plurality of pixel electrodes or configured for adjacent pixel electrodes in a same column of the plurality of pixel electrodes; and common electrode blocks in a same row of the plurality of common electrode blocks and a respective one of the plurality of common electrode lines are electrically connected through a via hole penetrating through the at least one insulating layer.

In some embodiments, the plurality of common electrode blocks and the plurality of shielding lines are in a same layer.

In some embodiments, an orthographic projection of the respective one of the plurality of common electrode blocks on the base substrate does not overlap the orthographic projection of the respective one of the plurality of shielding lines on the base substrate, and the respective one of the plurality of shielding lines and the respective one of the plurality of common electrode lines are in different layers, and the orthographic projection of the respective one of the plurality of shielding lines on the base substrate partially overlaps an orthographic projection of the respective one of the plurality of common electrode lines on the base substrate.

In some embodiments, the touch display substrate further includes a plurality of auxiliary conductive lines, a respective one of the plurality of auxiliary conductive lines being on and electrically connected to a surface of the respective one of the plurality of shielding lines.

In some embodiments, the touch display substrate further includes a plurality of gate lines insulated from and crossing the plurality of shielding lines. The respective one of the plurality of shielding lines includes a plurality of shielding line segments, and adjacent ones of the plurality of shielding line segments have a spacing therebetween at an overlap of an orthographic projection of a respective one of the plurality of gate lines on the base substrate and an orthographic projection of a respective one of the plurality of data lines on the base substrate.

In some embodiments, the common electrode includes a plurality of common electrode strips, each of the plurality of common electrode strips extending in a second direction and having an integral structure, and a respective one of the plurality of common electrode strips being configured for the at least one row of pixel electrodes; and the plurality of shielding lines and the common electrode are in different layers.

In some embodiments, an orthographic projection of the respective one of the plurality of common electrode strips on the base substrate at least partially overlaps an orthographic projection of the at least one row of pixel electrodes on the base substrate.

In another aspect, the present disclosure provides a touch display method, which may be applied to any one of the touch display substrates described herein. The method includes: in a display stage, outputting a common voltage level to the common electrode and the plurality of shielding lines; and in a touch stage, sequentially providing a touch driving signal to one of the plurality of first touch electrodes and the plurality of second touch electrodes, and receiving a touch sensing signal from the other of the plurality of first touch electrodes and the plurality of second touch electrodes.

In another aspect, the present disclosure provides a touch display device, including any one of the touch display substrates described herein.

In some embodiments, the touch display device further includes: a liquid crystal driving circuit configured to output a common voltage level to the common electrode and the plurality of shielding lines in a display stage; and a touch detection circuit configured to sequentially provide a touch driving signal to one of the plurality of first touch electrodes and the plurality of second touch electrodes and receive a touch sensing signal from the other of the plurality of first touch electrodes and the plurality of second touch electrodes in a touch stage.

DETAILED DESCRIPTION

In order to enable a person skilled in the art to better understand the technical solutions of the present disclosure, the present disclosure is further described in detail below with reference to the accompanying drawings and specific embodiments.

In the present disclosure, two structures being "arranged in a same layer" refers to that they are formed from a same material layer and thus are in the same layer in a stack relationship, but does not represent that they are equidistant from the base substrate, nor that other layer structures between them and the base substrate are identical.

In a touch display substrate of a conventional liquid crystal display device, a common electrode layer of a liquid crystal display panel is generally divided into a plurality of common electrode blocks, each common electrode block is electrically connected with a touch control chip through a wire, and the common electrode blocks are reused as touch electrodes. In the display state, the common electrode block is used for receiving a common voltage signal; and in the touch state, the common electrode block is used for receiving a touch driving signal and outputting a touch sensing signal.

Therefore, the touch mode of the above liquid crystal display device is self-capacitance touch, and the mutual-capacitance touch cannot be realized without adding a separate electrode.

Accordingly, the present disclosure provides, inter alia, a touch display substrate, a touch display method, and a touch display device that substantially obviate one or more of the problems due to limitations and disadvantages of the related art.

Figure 1:
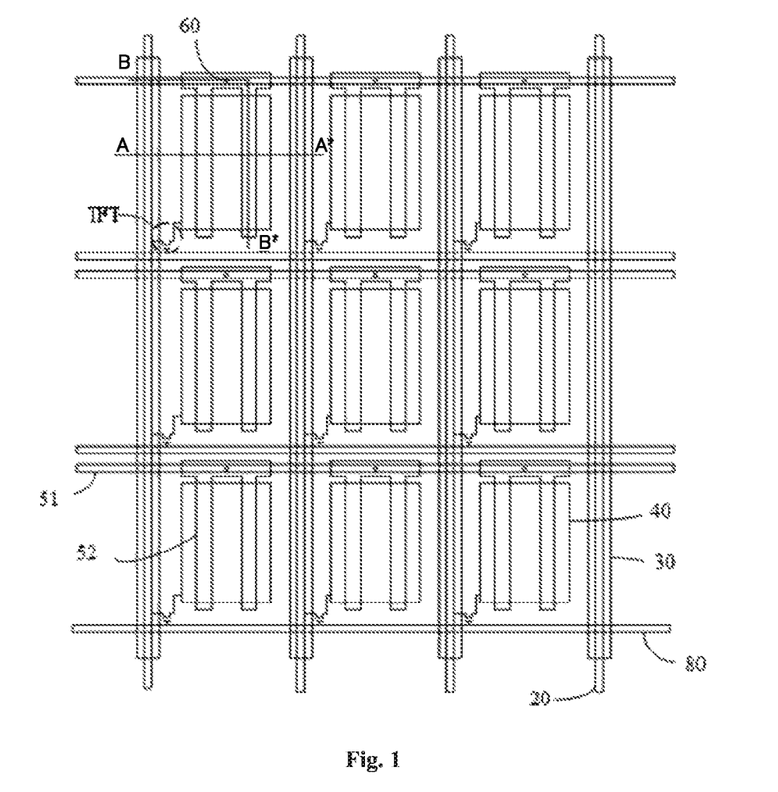
FIG. 1 is a plan view illustrating a structure of a touch display substrate according to some embodiments of the present disclosure.
Figure 2:
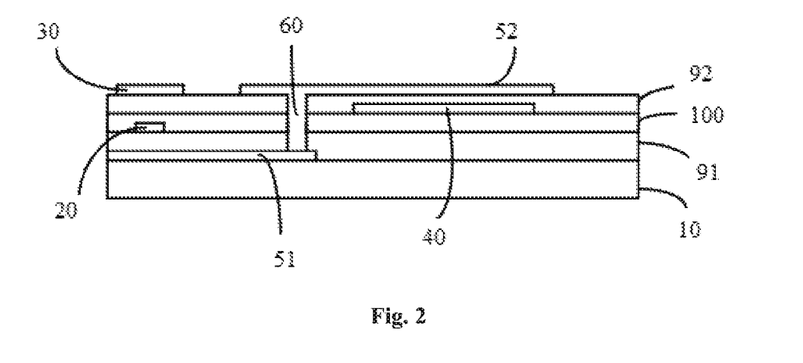
FIG. 2 is a cross-sectional view taken along line A-A' of the touch display substrate of FIG. 1.
Figure 3:
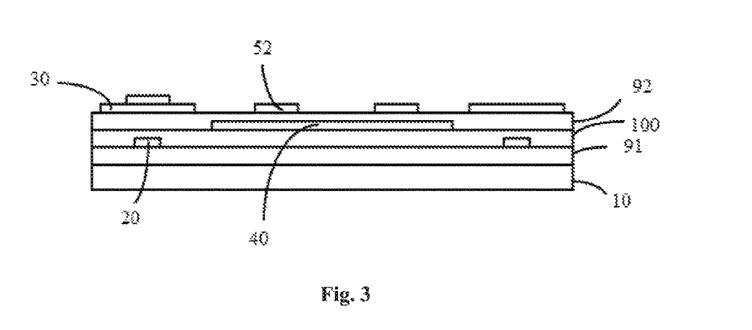
FIG. 3 is a cross-sectional view taken along line B-B' of the touch display substrate of FIG. 1.

In an aspect, the present disclosure provides a touch display substrate. FIG. 1 is a plan view illustrating a structure of a touch display substrate according to some embodiments of the present disclosure; FIG. 2 is a cross-sectional view taken along line A-A' of the touch display substrate of FIG. 1; and FIG. 3 is a cross-sectional view taken along line B-B' of the touch display substrate of FIG. 1. Referring to FIGS. 1 to 3, in some embodiments, the touch display substrate includes: a base substrate 10; a plurality of data lines 20 disposed on the base substrate 10 and extending in a column direction (e.g., a first direction); a plurality of shielding lines 30 disposed on a side of the plurality of data lines 20 away from the base substrate 10 and extending in the column direction, an orthographic projection of a respective one of the plurality of data lines 30 on the base substrate 10 at least partially overlapping an orthographic projection of a respective one of the plurality of shielding lines 30 on the base substrate 10; a plurality of pixel electrodes 40 arranged in an array having a plurality of rows and a plurality of columns; and a common electrode on a side of the plurality of pixel electrodes 40 away from the base substrate 10. The plurality of shielding lines 30 are insulated from the plurality of data lines 20.

In some embodiments, the touch display substrate includes a plurality of first touch electrodes, the common electrode corresponding to at least one row of pixel electrodes 40 constitutes a respective one of the plurality of first touch electrodes, and the plurality of first touch electrodes are insulated from each other. In some embodiments, the touch display substrate includes a plurality of first touch electrodes, the common electrode corresponding to a plurality of directly adjacent rows of pixel electrodes 40 constitutes a respective one of the plurality of first touch electrodes, and the plurality of first touch electrodes are insulated from each other. In some embodiments, the touch display substrate includes a plurality of second touch electrodes, at least one of the plurality of shielding lines 30 constitutes a respective one of the plurality of second touch electrodes, and the plurality of second touch electrodes are insulated from each other. In some embodiments, the touch display substrate includes a plurality of second touch electrodes, a plurality of directly adjacent shielding lines of the plurality of shielding lines 30 constitute a respective one of the plurality of second touch electrodes, and the plurality of second touch electrodes are insulated from each other. The plurality of first touch electrodes and the plurality of second touch electrodes are insulated from each other.

In an example, the touch display substrate is a liquid crystal touch display substrate including sub-pixels arranged in an array having a plurality of rows and a plurality of columns. Each sub-pixel (i.e., each pixel unit) is disposed therein a pixel electrode 40, and the common electrode is disposed above the pixel electrode 40. The common electrode may be in the form of a slit electrode, a comb electrode, or the like. The voltage difference between the pixel electrode 40 and the common electrode determines the luminance of the light emitted from the sub-pixel. The magnitude of the voltage on the pixel electrode 40 is written by the data line 20 through the driving transistor TFT corresponding to the pixel electrode 40. When the gate of the driving transistor TFT is connected to an active voltage level, the source and drain of the driving transistor TFT are electrically connected, that is, the data line 20 is electrically connected with the pixel electrode 40, and the voltage in the data line 20 is written into the pixel electrode 40.

In an embodiment, and referring to FIGS. 1 to 3, the plurality of shielding lines 30 are on a side of the plurality of data lines 20 away from the base substrate 10. In some embodiments, and referring to FIGS. 1 to 3, an orthographic projection of a respective one of the plurality of shielding lines 30 on the base substrate 10 overlaps an orthographic projection of a respective one of the plurality of data lines 20 on the base substrate 10. In a display stage, the respective one of the plurality of shielding lines 30 may be applied with a common voltage level or grounded, and the respective one of the plurality of data lines 20 is shielded by the respective one of the plurality of shielding lines 30, preventing the respective one of the plurality of data lines 20 from affecting circuit structures (not shown) above the respective one of the plurality of shielding lines 30. For example, the circuit structures may be disposed on a side of the respective one of the shielding lines 30 away from the base substrate 10. It should be noted that the line B-B' in FIG. 1 is a curved line.

The common electrode corresponding to at least one row of pixel electrodes 40 constitutes one first touch electrode. In the touch stage, the one first touch electrode may be used as a touch driving electrode and applied with a touch driving signal Tx. Needless to say, the one first touch electrode may also be used as a touch sensing electrode for detecting a touch sensing signal Rx.

In an embodiment and referring to FIG. 1, the common electrode may include a plurality of common electrode blocks 52. The plurality of common electrode blocks 52 may also be arranged in an array having a plurality of rows and a plurality of columns. In some embodiments, one row of common electrode blocks 52 are electrically connected together by a respective one of a plurality of common electrode lines 51, and the entirety of the one row of common electrode blocks 52 serves as one first touch electrode. In some embodiments, two or more adjacent rows of common electrode blocks 52 may be electrically connected together, and the entirety of the two or more adjacent rows of common electrode blocks 52 serves as one first touch electrode.

Figure 5:
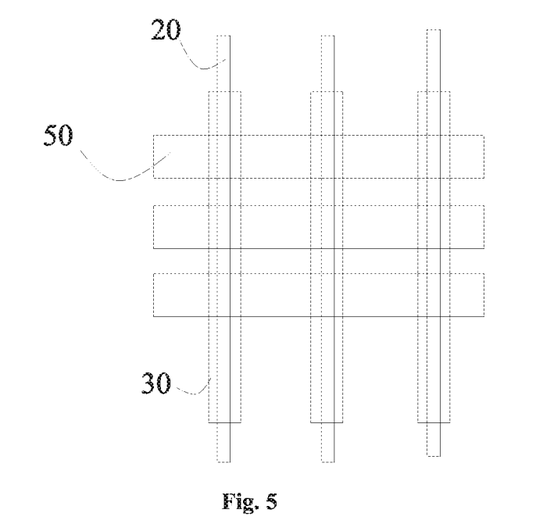
FIG. 5 is a plan view illustrating a structure of another touch display substrate according to some embodiments of the present disclosure.

FIG. 5 is a plan view illustrating a structure of another touch display substrate according to some embodiments of the present disclosure. As shown in FIG. 5, the common electrode may include a plurality of common electrode strips 50 each extending in a row direction (e.g., a second direction different from the first direction) and having an integral structure, and the plurality of shielding lines 30 and the common electrode are disposed in different layers. For example, the plurality of shielding lines 30 and the common electrode may be disposed in different layers by adding an insulating layer between the plurality of shielding lines 30 and the common electrode. In FIG. 5, a respective one of the plurality of common electrode strips 50 may correspond to at least one row of pixel electrodes 40 (i.e., an orthographic projection of the respective one of the plurality of common electrode strips 50 on the base substrate 10 at least partially overlaps an orthographic projection of the at least one row of pixel electrodes 40 on the base substrate 10). In FIG. 5, a respective one of the plurality of common electrode strips 50 may also correspond to a plurality of directly adjacent rows of pixel electrodes 40 (i.e., an orthographic projection of the respective one of the plurality of common electrode strips 50 on the base substrate 10 at least partially overlaps an orthographic projection of each of the plurality of directly adjacent rows of pixel electrodes 40 on the base substrate 10).

As used herein, the terms "row" and "column" merely denote two different directions that intersect with each other, although in the current view of the figures they are a transverse direction and a longitudinal direction, and do not mean that in an actual product, a row must be a transverse direction and a column must be a longitudinal direction.

Needless to say, the plurality of first touch electrodes should be insulated from each other, so that they are a plurality of independent electrodes, and can be used as touch driving electrodes or touch sensing electrodes.

At least one of the plurality of shielding lines 30 constitutes one second touch electrode. In the touch stage, the one second touch electrode may be used as a touch driving electrode and applied with a touch driving signal Tx. Needless to say, the one second touch electrode may also be used as a touch sensing electrode for detecting a touch sensing signal Rx. Touch operation can be realized as long as the functions of the second touch electrode and the first touch electrode are different from each other.

Specific implementation principles related to the touch sensing operation and the touch driving operation are known to those skilled in the art and will not be described herein.

In some embodiments, a respective one of the plurality of shielding lines 30 independently serves as one second touch electrode. In some embodiments, two or more adjacent shielding lines 30 may be electrically connected together, and the entirety of the two or more adjacent shielding lines 30 serves as one second touch electrode.

In some embodiments, the plurality of shielding lines 30 may be disposed in the same layer as the common electrode, the common electrode in a same row is of an integral structure, and a respective one of the plurality of shielding lines 30 is electrically connected by a jumper wire at a location where it overlaps the common electrode.

That is, the shielding line 30 may be formed as an integral line, or a plurality of lines may be electrically connected by jumper wire(s) to form one shielding line 30.

The first touch electrode and the second touch electrode are insulated from each other. Therefore, in the touch stage, the first touch electrode and the second touch electrode can be respectively used as a touch driving electrode and a touch sensing electrode, so as to realize mutual-capacitance touch function.

In some embodiments, and referring to FIGS. 1 to 3, the plurality of shielding lines 30 are disposed in the same layer as the plurality of common electrode blocks 52, and an orthographic projection of a respective one of the plurality of common electrode blocks 52 on the base substrate 10 does not overlap an orthographic projection of a respective one of the plurality of shielding lines 30 on the base substrate 10. The respective one of the plurality of shielding lines 30 is disposed in a different layer from a respective one of the plurality of common electrode lines 51 and the orthographic projection of the respective one of the plurality of shielding lines 30 on the base substrate 10 partially overlaps (e.g., intersects in the plan view of FIG. 1) an orthographic projection of the respective one of the plurality of common electrode lines 51 on the base substrate 10. There is a capacitance between the respective one of the plurality of shielding lines 30 and the respective one of the plurality of common electrode blocks 52 (i.e., the adjacent common electrode block located at a side of the respective one of the plurality of shielding lines 30), and there is also a capacitance between the respective one of the plurality of shielding lines 30 and the respective one of the plurality of common electrode lines 51. In some embodiments, and as shown in FIG. 5, a respective one of the plurality of shielding lines 30 and a respective one of the plurality of common electrode strips 50 may form a capacitance at an overlap therebetween.

By designing the shapes, layer stack arrangement, and electrical connection relationship of the shielding line 30 and the common electrode as described above, the mutual-capacitance touch can be realized without adding a new electrode structure.

In some embodiments, the common electrode blocks 52 in a same row are electrically connected and constitute one first touch electrode; and the shielding line 30 in a same column constitutes one second touch electrode.

Therefore, the common electrode and the shielding lines existing in the touch display substrate can be utilized to the maximum extent, so as to form touch sensing points with the maximum number.

In some embodiments, the touch display substrate further includes a plurality of common electrode lines 51 extending in a row direction and insulated from the plurality of data lines 20. The plurality of common electrode lines 51 overlap the common electrode with at least one insulating layer disposed therebetween. The common electrode includes a plurality of common electrode blocks 52 arranged in an array having a plurality of rows and a plurality of columns, a respective one of the plurality of common electrode blocks 52 corresponds to a respective one of the plurality of pixel electrodes 40 or corresponds to multiple adjacent pixel electrodes 40 in a same column of the plurality of pixel electrodes 40, and the common electrode blocks 52 in a same row and a respective one of the plurality of common electrode lines 51 are electrically connected through a via hole 60 penetrating through the at least one insulating layer.

In an embodiment, and as shown in FIGS. 1 and 2, the common electrode includes a plurality of common electrode blocks 52; and a respective one of the plurality of common electrode lines 51 overlaps a respective one of the plurality of common electrode blocks 52 with a first insulating layer 92, a passivation layer 100, and a gate insulating layer 91 sequentially interposed therebetween.

In the embodiment shown FIG. 1, each common electrode block 52 corresponds to a respective one pixel electrode 40. In other embodiments, two or three pixel electrodes 40 in a same column may correspond to a respective one common electrode block 52. However, the present disclosure is not limited thereto.

As shown in FIG. 1, a respective one of the plurality of common electrode lines 51 is configured to electrically connect the common electrode blocks 52 in a same row as one first touch electrode, and the one first touch electrode is configured to receive a touch driving signal Tx or output a touch sensing signal Rx.

Figure 7:
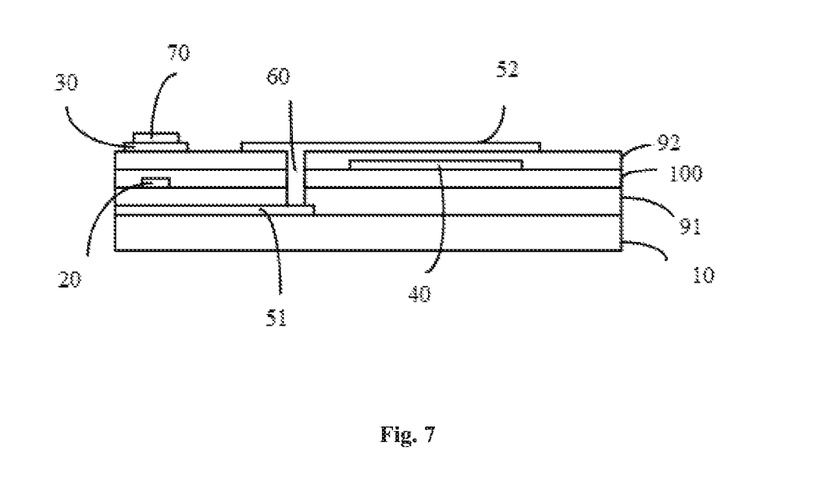
FIG. 7 is a cross-sectional view taken along line A-A' of the touch display substrate of FIG. 6.

In some embodiments, and as shown in FIGS. 2 and 7, the plurality of common electrode blocks 52 are disposed in the same layer as the plurality of shielding lines 30.

In the above embodiment, the signals in the common electrode blocks 52 in different rows are transmitted through different common electrode lines 51, so the common electrode blocks 52 are not required to overlap the shielding lines 30. Thus, the common electrode blocks 52 and the shielding lines 30 may be disposed in the same layer, so that the common electrode blocks 52 and the shielding lines 30 may be formed in a single patterning process, and the manufacturing process is simplified.

Figure 6:
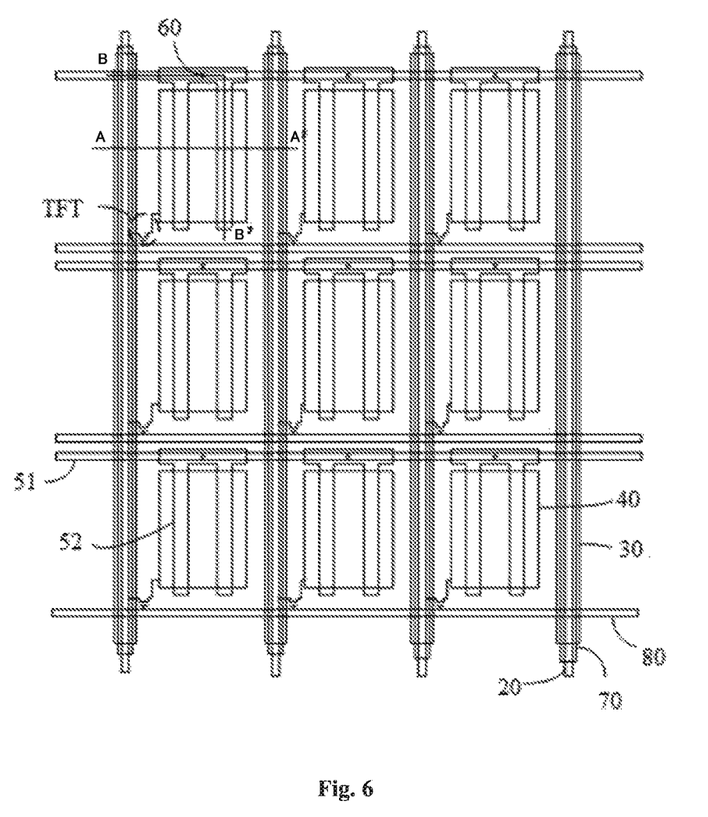
FIG. 6 is a plan view illustrating a structure of another touch display substrate according to some embodiments of the present disclosure.

FIG. 6 is a plan view illustrating a structure of another touch display substrate according to some embodiments the present disclosure; FIG. 7 is a cross-sectional view taken along line A-A' of the touch display substrate of FIG. 6; and FIG. 8 is a cross-sectional view taken along line B-B' of the touch display substrate of FIG. 6.

Figure 8:
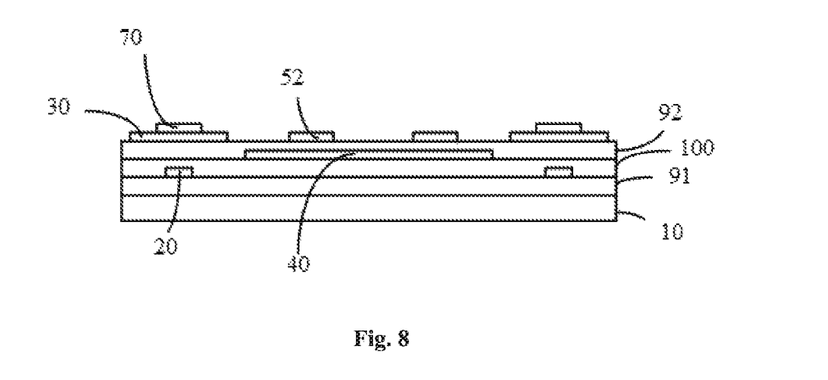
FIG. 8 is a cross-sectional view taken along line B-B' of the touch display substrate of FIG. 6.

In some embodiments, and as shown in FIGS. 6 to 8, the touch display substrate further includes a plurality of auxiliary conductive lines 70, and a respective one of the plurality of auxiliary conductive lines 70 is disposed on and electrically connected to a surface of a respective one of the plurality of shielding lines 30. In an embodiment, a respective one of the plurality of auxiliary lines 70 is disposed on and in direct contact with a surface of a respective one of the plurality of shielding lines 30.

The auxiliary conductive line 70 is formed of a conductive material, which corresponds to a conductive line connected in parallel to the shielding line 30, and thus the resistance can be reduced, which facilitates the transmission of signals therein.

Figure 9:
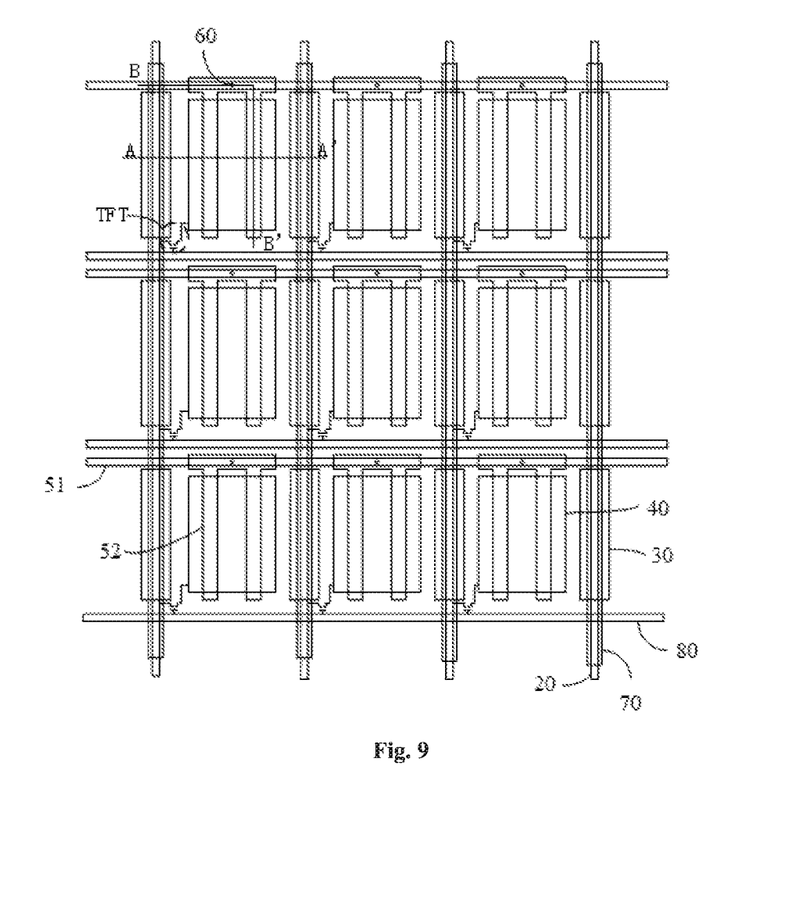
FIG. 9 is a plan view illustrating a structure of another touch display substrate according to some embodiments of the present disclosure.

FIG. 9 is a plan view illustrating a structure of another touch display substrate according to some embodiments of the present disclosure. In some embodiments, and as shown in FIG. 9, the touch display substrate further includes a plurality of gate lines 80 insulated from and crossing the plurality of shielding lines 30. A respective one of the plurality of shielding lines 30 (and optionally an auxiliary conductive line 70 thereon) has a spacing at an overlap of an orthographic projection of a respective one of the plurality of gate lines 80 on the base substrate 10 and an orthographic projection of a respective one of the plurality of data lines 20 on the base substrate 10. That is, as shown in FIG. 9, a respective one of the plurality of shielding lines 30 may include a plurality of shielding line segments, and adjacent ones of the plurality of shielding line segments (and optionally an auxiliary conductive line thereon) have a spacing therebetween at an overlap of an orthographic projection of a respective one of the plurality of gate lines 80 on the base substrate 10 and an orthographic projection of a respective one of the plurality of data lines 20 on the base substrate 10. The plurality of shielding line segments are electrically connected together for transmitting a signal.

As such, compared to the embodiment shown in FIG. 6, the embodiment shown in FIG. 9 may further reduce the coupling capacitance between the shielding line 30 and the data line 20, thereby reducing the effect on the signal in the data line 20.

Various suitable conductive-line materials may be used for making the gate line 80, the data line 20, the common electrode line 51, and the shielding line 30. Examples of suitable conductive-line materials for making the gate line 80, the data line 20, the common electrode line 51, and the shielding line 30 may include, but are not limited to, metal materials such as Cu, Al, Mo, Ti, Cr, and W, and alloys thereof. The gate line 80, the data line 20, the common electrode line 51, or the shielding line 30 may have a single-layer structure or a multi-layer structure, such as Mo\Al\Mo, Ti\Cu\Ti, or Mo\Ti\Cu.

Various suitable insulating materials may be used for making the gate insulating layer 91. Examples of suitable insulating materials for making the gate insulating layer 91 may include, but are not limited to, silicon nitride or silicon oxide. The gate insulating layer 91 may have a single-layer structure or a multi-layer structure, for example, a double-layer structure of silicon oxide/silicon nitride.

Various suitable passivation materials may be used for making the passivation layer 100. Examples of suitable passivation materials for making the passivation layer 100 may include, but are not limited to, silicon nitride or silicon oxide. The passivation layer 100 may have a single-layer structure or a multi-layer structure, such as a structure of silicon oxide/silicon nitride.

Various suitable insulating materials may be used for making the first insulating layer 92. Examples of suitable insulating materials for making the first insulating layer 92 may include, but are not limited to, silicon nitride or silicon oxide. The first insulating layer 92 may have a single-layer structure or a multi-layer structure, such as a structure of silicon oxide/silicon nitride.

Various suitable electrode materials may be used for making the pixel electrode 40. Examples of suitable electrode materials for making the pixel electrode 40 may include, but are not limited to, ITO, IZO, or other transparent metal oxide conductive materials.

Various suitable conductive materials may be used for making the common electrode block 52 and the integral common electrode strip 50. Examples of suitable conductive materials for making the common electrode block 52 and the integral common electrode strip 50 may include, but are not limited to, ITO, IZO or other transparent metal oxide conductive materials. The shielding line 30 may be made of the same material as the common electrode block and the common electrode strip.

In another aspect, an embodiment of the present disclosure further provides a touch display method, which can be applied to any touch display substrate described herein, and the method includes: outputting a common voltage level to the common electrode and the plurality of shielding lines 30 in a display stage; and sequentially providing a touch driving signal to each of the first touch electrodes and receiving a touch sensing signal from each of the second touch electrodes in the touch stage, or sequentially providing a touch driving signal to each of the second touch electrodes and receiving a touch sensing signal from each of the first touch electrodes in the touch stage.

Figure 4:
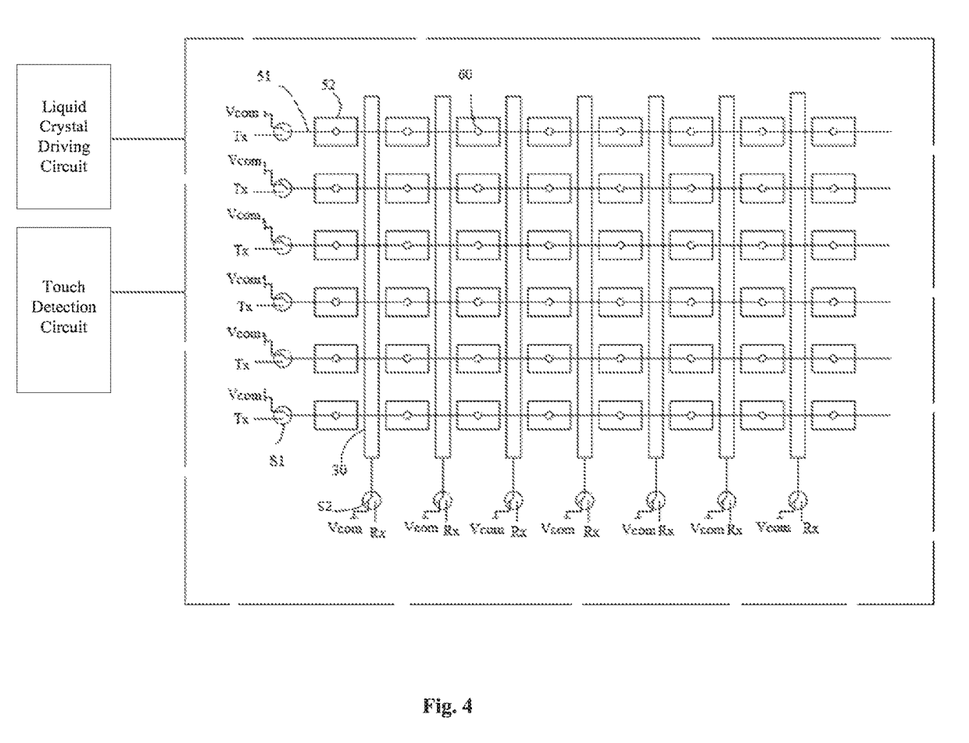
FIG. 4 is a schematic diagram of touch and display of the touch display substrate of FIG. 1.

FIG. 4 is a schematic diagram of touch and display of the touch display substrate of FIG. 1. Taking FIG. 4 as an example, in the display stage, a respective one of the plurality of common electrode lines 51 is connected with a liquid crystal driving circuit through a respective one of a plurality of first switches Si to receive a common voltage level Vcom, so as to apply the common voltage level Vcom to the common electrode blocks 52 electrically connected to the respective one of the plurality of common electrode lines 51, and a respective one of the shielding lines 30 is connected with the liquid crystal driving circuit through a respective one of a plurality of second switches S2 to receive the common voltage level Vcom, so as to apply the common voltage level Vcom to the respective one of the shielding lines 30. In the touch stage, the plurality of common electrode lines 51 are connected with a touch detection circuit through the plurality of first switches Si to receive the touch driving signal Tx, so as to apply the touch driving signal Tx to each common electrode block 52, and the plurality of shielding lines 30 are connected with the touch detection circuit through the plurality of second switches S2 to output the touch sensing signal Rx, so that the touch detection circuit can detect the touch sensing signal Rx in each shielding line 30.

In the embodiment shown in FIG. 4, the common electrode block 52 may also be used for outputting the touch sensing signal Rx to the touch detection circuit, and the shielding line 30 may also be used for receiving the touch driving signal Tx from the touch detection circuit. The present disclosure is not limited thereto.

The liquid crystal driving circuit and the touch detection circuit may be devices with signal sending capability, such as a voltage source, a chip and the like, and may be mutually independent or integrated.

By adopting the touch display method provided by the embodiment, mutual-capacitance touch can be realized by only changing the shapes and the connection relationship of the common electrode and the shielding line without adding a new electrode structure on the basis of the conventional liquid crystal touch display substrate.

In another aspect, an embodiment of the present disclosure further provides a touch display device, which includes any one of the touch display substrates described herein. The touch display device may be any product or component having a display function, such as a liquid crystal touch display panel, a liquid crystal touch display module, a mobile phone, a tablet computer, a television, a display, a notebook computer, a digital photo frame, a navigator and the like.

In some embodiments, the touch display device further includes a liquid crystal driving circuit and a touch detection circuit. The liquid crystal driving circuit is configured to output a common voltage level to the common electrode and the shielding lines in a display stage; and the touch detection circuit is configured to provide a touch driving signal to each of the first touch electrodes sequentially and receive a touch sensing signal from each of the second touch electrodes in a touch stage, or provide a touch driving signal to each of the second touch electrodes sequentially and receive a touch sensing signal from each of the first touch electrodes in a touch stage.

That is, according to the driving method provided in the above embodiments, the liquid crystal driving circuit and the touch detection circuit are configured to implement the two functions of liquid crystal display and mutual-capacitance touch in a time-sharing manner.

It is to be understood that the above embodiments are merely exemplary embodiments employed to explain the principles of the present disclosure, and the present disclosure is not limited thereto. Various modifications and improvements may be made by those skilled in the art without departing from the spirit and essence of the present disclosure, and these modifications and improvements shall be within the scope of the present disclosure.

What is claimed is:

1. A touch display substrate, comprising:
   a base substrate;
   a plurality of data lines on the base substrate and extending in a first direction;
   a plurality of shielding lines on a side of the plurality of data lines away from the base substrate and extending in the first direction, an orthographic projection of a respective one of the plurality of data lines on the base substrate at least partially overlapping an orthographic projection of a respective one of the plurality of shielding lines on the base substrate;
   a plurality of pixel units arranged in an array having a plurality of rows and a plurality of columns, each pixel unit comprising a pixel electrode; and
   a common electrode on a side of the pixel electrode away from the base substrate, wherein the touch display substrate further comprises a plurality of first touch electrodes, the common electrode of at least one row of pixel units of the plurality of pixel units constitutes a respective one of the plurality of first touch electrodes, and the plurality of first touch electrodes are insulated from each other;

the touch display substrate further comprises a plurality of second touch electrodes, at least one of the plurality of shielding lines constitutes a respective one of the plurality of second touch electrodes, and the plurality of second touch electrodes are insulated from each other; and the plurality of first touch electrodes and the plurality of second touch electrodes are insulated from each other.

2. The touch display substrate of claim 1, wherein the common electrode of directly adjacent rows of pixel units of the plurality of pixel units constitutes the respective one of the plurality of first touch electrodes; and directly adjacent ones of the plurality of shielding lines are electrically connected and constitute the respective one of the plurality of second touch electrodes.

3. The touch display substrate of claim 1, further comprising: a plurality of common electrode lines extending in a second direction different from the first direction and insulated from the plurality of data lines, wherein the plurality of common electrode lines overlap the common electrode, and at least one insulating layer is between the plurality of common electrode lines and the common electrode;

the common electrode comprises a plurality of common electrode blocks arranged in an array having a plurality of rows and a plurality of columns;

a respective one of the plurality of common electrode blocks is in a respective one of the plurality of pixel units or in adjacent pixel units in a same column of the plurality of pixel units; and common electrode blocks in a same row of the plurality of common electrode blocks and a respective one of the plurality of common electrode lines are electrically connected through a via hole penetrating through the at least one insulating layer.

4. The touch display substrate of claim 3, wherein the plurality of common electrode blocks and the plurality of shielding lines are in a same layer.

5. The touch display substrate of claim 4, wherein an orthographic projection of the respective one of the plurality of common electrode blocks on the base substrate does not overlap the orthographic projection of the respective one of the plurality of shielding lines on the base substrate, and the respective one of the plurality of shielding lines and the respective one of the plurality of common electrode lines are in different layers, and the orthographic projection of the respective one of the plurality of shielding lines on the base substrate partially overlaps an orthographic projection of the respective one of the plurality of common electrode lines on the base substrate.

6. The touch display substrate of claim 1, further comprising a plurality of auxiliary conductive lines, a respective one of the plurality of auxiliary conductive lines being on and electrically connected to a surface of the respective one of the plurality of shielding lines.

7. The touch display substrate of claim 6, further comprising: a plurality of gate lines insulated from and crossing the plurality of shielding lines, wherein the respective one of the plurality of shielding lines comprises a plurality of shielding line segments, and adjacent ones of the plurality of shielding line segments have a spacing therebetween at an overlap of an orthographic projection of a respective one of the plurality of gate lines on the base substrate and an orthographic projection of a respective one of the plurality of data lines on the base substrate.

8. The touch display substrate of claim 1, wherein the common electrode comprises a plurality of common electrode strips, each of the plurality of common electrode strips extending in a second direction and having an integral structure, and a respective one of the plurality of common electrode strips being in the at least one row of pixel units; and the plurality of shielding lines and the common electrode are in different layers.

9. The touch display substrate of claim 8, wherein an orthographic projection of the respective one of the plurality of common electrode strips on the base substrate at least partially overlaps an orthographic projection of the at least one row of pixel units on the base substrate.

10. A touch display device, comprising the touch display substrate of claim 1.

11. The touch display device of claim 10, further comprising:

a liquid crystal driving circuit configured to output a common voltage level to the common electrode and the plurality of shielding lines in a display stage; and a touch detection circuit configured to provide a touch driving signal to one of the plurality of first touch electrodes and the plurality of second touch electrodes sequentially and receive a touch sensing signal from the other of the plurality of first touch electrodes and the plurality of second touch electrodes in a touch stage.

12. A touch display method for driving a touch display substrate, wherein the touch display substrate comprises a base substrate; a plurality of data lines on the base substrate and extending in a first direction; a plurality of shielding lines on a side of the plurality of data lines away from the base substrate and extending in the first direction, an orthographic projection of a respective one of the plurality of data lines on the base substrate at least partially overlapping an orthographic projection of a respective one of the plurality of shielding lines on the base substrate; a plurality of pixel units arranged in an array having a plurality of rows and a plurality of columns, each pixel unit comprising a pixel electrode; and a common electrode on a side of the pixel electrode away from the base substrate, wherein the touch display substrate further comprises a plurality of first touch electrodes, the common electrode of at least one row of pixel units of the plurality of pixel units constitutes a respective one of the plurality of first touch electrodes, and the plurality of first touch electrodes are insulated from each other; the touch display substrate further comprises a plurality of second touch electrodes, at least one of the plurality of shielding lines constitutes a respective one of the plurality of second touch electrodes, and the plurality of second touch electrodes are insulated from each other; and the plurality of first touch electrodes and the plurality of second touch electrodes are insulated from each other, wherein the method comprises:

in a display stage, outputting a common voltage level to the common electrode and the plurality of shielding lines; and in a touch stage, providing a touch driving signal to one of the plurality of first touch electrodes and the plurality of second touch electrodes sequentially, and receiving a touch sensing signal from the other of the plurality of first touch electrodes and the plurality of second touch electrodes.

13. The touch display method of claim 12, wherein the common electrode of directly adjacent rows of pixel units of the plurality of pixel units constitutes the respective one of the plurality of first touch electrodes; and directly adjacent ones of the plurality of shielding lines are electrically connected and constitute the respective one of the plurality of second touch electrodes.

14. The touch display method of claim 12, wherein the touch display substrate further comprises: a plurality of common electrode lines extending in a second direction different from the first direction and insulated from the plurality of data lines, wherein the plurality of common electrode lines overlap the common electrode, and at least one insulating layer is between the plurality of common electrode lines and the common electrode;

the common electrode comprises a plurality of common electrode blocks arranged in an array having a plurality of rows and a plurality of columns;

a respective one of the plurality of common electrode blocks is in a respective one of the plurality of pixel units or in adjacent pixel units in a same column of the plurality of pixel units; and common electrode blocks in a same row of the plurality of common electrode blocks and a respective one of the plurality of common electrode lines are electrically connected through a via hole penetrating through the at least one insulating layer.

15. The touch display method of claim 14, wherein the plurality of common electrode blocks and the plurality of shielding lines are in a same layer.

16. The touch display method of claim 15, wherein an orthographic projection of the respective one of the plurality of common electrode blocks on the base substrate does not overlap the orthographic projection of the respective one of the plurality of shielding lines on the base substrate, and the respective one of the plurality of shielding lines and the respective one of the plurality of common electrode lines are in different layers, and the orthographic projection of the respective one of the plurality of shielding lines on the base substrate partially overlaps an orthographic projection of the respective one of the plurality of common electrode lines on the base substrate.

17. The touch display method of claim 12, wherein the touch display substrate further comprises a plurality of auxiliary conductive lines, a respective one of the plurality of auxiliary conductive lines being on and electrically connected to a surface of the respective one of the plurality of shielding lines.

18. The touch display method of claim 17, wherein the touch display substrate further comprises: a plurality of gate lines insulated from and crossing the plurality of shielding lines, wherein the respective one of the plurality of shielding lines comprises a plurality of shielding line segments, and adjacent ones of the plurality of shielding line segments have a spacing therebetween at an overlap of an orthographic projection of a respective one of the plurality of gate lines on the base substrate and an orthographic projection of a respective one of the plurality of data lines on the base substrate.

19. The touch display method of claim 12, wherein the common electrode comprises a plurality of common electrode strips, each of the plurality of common electrode strips extending in a second direction and having an integral structure, and a respective one of the plurality of common electrode strips being in the at least one row of pixel units; and the plurality of shielding lines and the common electrode are in different layers.

20. The touch display method of claim 19, wherein an orthographic projection of the respective one of the plurality of common electrode strips on the base substrate at least partially overlaps an orthographic projection of the at least one row of pixel units on the base substrate.

* * * * *